United States Patent
Ho et al.

(10) Patent No.: US 7,720,984 B2
(45) Date of Patent: May 18, 2010

(54) METHOD AND SYSTEM FOR STREAM PROCESSING WEB SERVICES

(75) Inventors: Ricky Ho, San Jose, CA (US); Philip Clifford Jacobs, Windham, NH (US)

(73) Assignee: Cisco Technology, Inc., San Jose, CA (US)

( * ) Notice: Subject to any disclaimer, the term of this patent is extended or adjusted under 35 U.S.C. 154(b) by 954 days.

(21) Appl. No.: 11/349,593

(22) Filed: Feb. 7, 2006

(65) Prior Publication Data
US 2007/0186004 A1    Aug. 9, 2007

(51) Int. Cl.
*G06F 15/16* (2006.01)
(52) U.S. Cl. .................. 709/231; 709/236; 709/237; 709/238
(58) Field of Classification Search ......... 709/230–238, 709/219; 707/3, 100
See application file for complete search history.

(56) References Cited

U.S. PATENT DOCUMENTS

| | | | | |
|---|---|---|---|---|
| 4,727,495 | A * | 2/1988 | Cheetham et al. ........... | 709/204 |
| 7,047,310 | B2 * | 5/2006 | Bedekar et al. ............. | 709/232 |
| 7,113,942 | B2 * | 9/2006 | Levanoni et al. .............. | 707/3 |
| 2002/0083189 | A1 * | 6/2002 | Connor ....................... | 709/236 |
| 2002/0116522 | A1 | 8/2002 | Zelig | |
| 2002/0138549 | A1 | 9/2002 | Urein | |
| 2003/0023873 | A1 * | 1/2003 | Ben-Itzhak ................. | 713/201 |
| 2004/0122920 | A1 * | 6/2004 | Josset et al. ................. | 709/222 |
| 2004/0165530 | A1 * | 8/2004 | Bedekar et al. ............. | 370/235 |
| 2004/0193687 | A1 * | 9/2004 | Christensen et al. ........ | 709/206 |
| 2004/0215802 | A1 | 10/2004 | Amini et al. | |
| 2004/0268244 | A1 * | 12/2004 | Levanoni et al. ............ | 715/514 |

OTHER PUBLICATIONS http://www.saxproject.org/, "About SAX", Nov. 11, 2001.
Slominski, Aleksander; "Home page of XML Pull Parser (XPP)", http://www.extreme.indiana.edu/xgws/xsoap/xpp/, Jun. 11, 2002.
Haas, Hugo; "Web Services Message Exchange Patterns", http://www.w3.org/2002/ws/cg/2/07/meps.html#SOAP2 , Jul. 22, 2002.
Kavantzas et al., "Web Services Choreography Description Language Version 1.0", http://www.w3.org/TR/2004/WD-ws-cdl-10-20041217/ , Feb. 3, 2005.
Arkin et al., "Web Service Choreography Interface (WSCI) 1.0", http://www.w3.org/TR/wsci/ , Aug. 8, 2002.
The IEEE and The Open Group, "9. Regular Expressions", The Open Group Base Specifications Issue 6, http://www.opengroup.org/onlinepubs/009695399/basedefs/xbd_chap09.html , Jun. 28, 2004.
Ambler, Scott W.; "Introduction to Data Flow Diagram (DFD)s", http://www.agilemodeling.com/artifacts/dataFlowDiagram.htm  , Jun. 29, 2003.

(Continued)

*Primary Examiner*—Wing F Chan
*Assistant Examiner*—Razu A Miah
(74) *Attorney, Agent, or Firm*—Stolowitz Ford Cowger LLP

(57) ABSTRACT

Systems and methods for stream processing message data relating to a web service application are described. One system has an input pipe for receiving multiple interrelated session based messages according to an order with which they originate. A processor processes an accumulation of the messages upon reaching a trigger point related to grammar characterizing the messages.

13 Claims, 7 Drawing Sheets

OTHER PUBLICATIONS

"The ICEBERG Project: Overview", http://iceberg.cs.berkeley.edu/overview.html , Jun. 19, 2000.

Weber et al., "Webflow: Decentralized Workflow Management in the World Wide Web", Apr. 30, 2003.

* cited by examiner

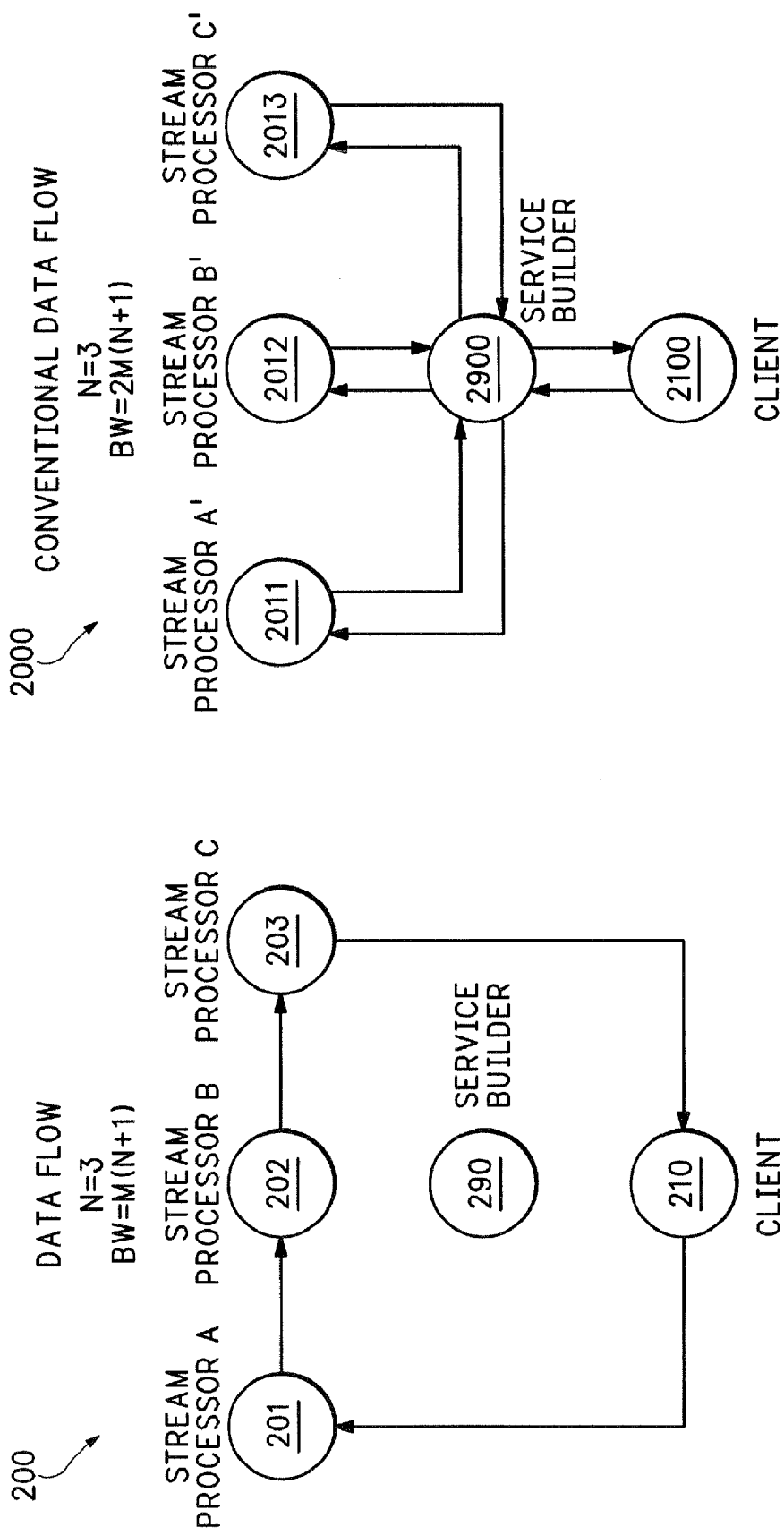

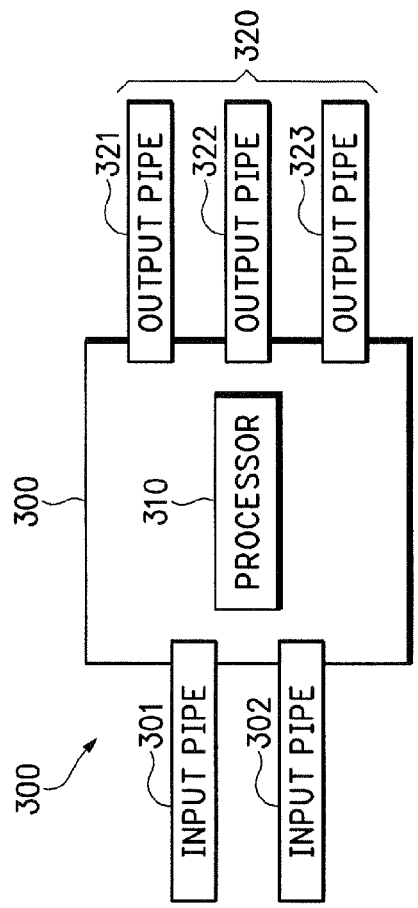
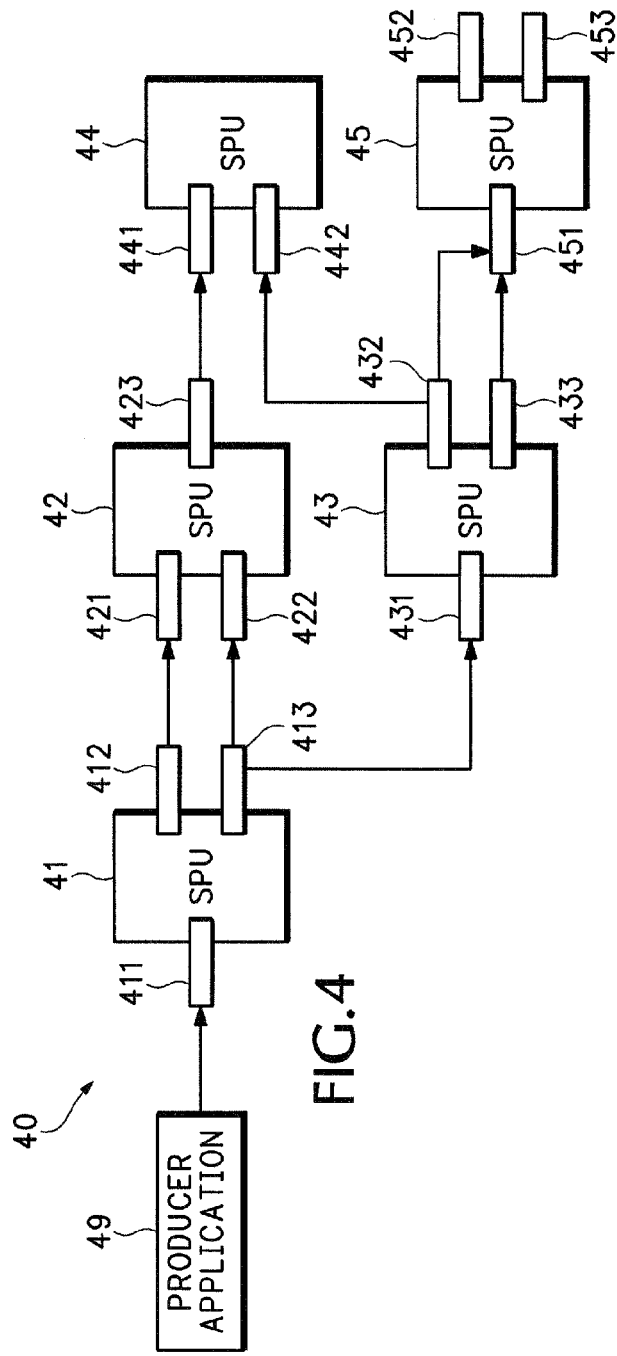
FIG.3
FIG.4

METHOD AND SYSTEM FOR STREAM PROCESSING WEB SERVICES

TECHNOLOGY

The present invention relates to networking. More specifically, embodiments of the present invention relate to methods and systems for stream processing web services.

BACKGROUND

Web services have become a significant aspect of modern networking. Web services have widespread utility in conducting modern network based commercial transactions and other business functions, which have proliferated with rapid, recent development in fields relating to computing, networking, communications and others. In such fields, web services allow two remote applications that are networked with the network to communicate with each other and exchange information.

The requestor/response model and the one way message model represent typical modern web service paradigms. The requestor/response model functions with a mechanism wherein a requester sends out a request message and gets back a response message from a responder. The one way model functions with a mechanism wherein a sender sends out a message with no provision required for awaiting a response.

In the familiar requestor/response model, a requester sends a request message to the service provider, and then receives its response message. These web services functions are performed using Simple Object Access Protocol (SOAP), and Web Service Definition Language (WSDL). SOAP represents how the requester above communicates with the service provider.

UDDI allows a global lookup base for locating services and represents the index service of the exemplary server above. Thus the requestor accesses information relating to the service being sought. The services are described in the UDDI with WSDL, which maps to the information in the server. Web services transaction and other information may comprise data in Extensible Markup Language (XML).

A more recently emerging (e.g., currently still maturing) rather sophisticated web services model uses techniques sometimes referred to as "orchestration" and/or "choreography" to effectuate a complex message exchange process. For instance, a central coordinator is typical in such schemes to send and receive messages. The central coordinator functions to determine a path and route the message through the network to an appropriate endpoint (e.g., destination) according to certain pre-defined flow logic with which it is programmed.

Messages sent according to this model route through the central coordinator as a single point of control, which determines for example when the message should be routed to a next step, routed along a subsequent hop, etc. For applications requiring fast real-time response, this single point of control however has the potential to become a bottleneck for its message traffic. Bottlenecking at the central coordinator in this model can have significant impact on web services related parameters such as overall throughput and response time.

In contrast to the central coordinator based model, one conventional approach uses a web services intermediary. The web services intermediary tries to intercept messages along their transport path, perform some processing thereon and forward the message on towards its final (e.g., designated) destination. This architecture is typically used for effective insertion of message processing logic along the message path.

This processing logic however typically relates to control in the intermediary itself (e.g., proxies, gateways), which are very localized and optimized for the networked entity to which they belong and may thus lack a more global view, e.g., of other intermediaries involved in a request/response, etc. Moreover, the lack of a central coordinator or similar central control point can complicate tracing a message's routing path and/or debugging the corresponding message processing logic.

Thus, the available conventional web services approaches can demand a tradeoff between manageability and efficiency. Conventional web services and XML environments thus do not function (e.g., lack adequate mechanisms) to simultaneously handle a message stream with both high efficiency, e.g., without potential bottlenecking in a single control point, and the high manageability available with centralized flow control.

For instance, the centralized control characteristic of the conventional orchestration approach promotes manageability, but can devolve in some circumstances into a traffic bottleneck that impacts efficiency. The conventional intermediary approach, on the other hand, allows each gatekeeper (e.g., gateway, proxy) to make trafficking decisions locally. However, there may be issues that can complicate tracking, e.g., why a certain traffic decision is made, which can impact manageability.

Moreover, the architectures characterizing these conventional web services are not designed to optimize stream processing of messages wherein message processing need to happen before the full message is received. "Stream processing capability" is very important for providing high throughput of large messages or continuous data.

The conventional web services architecture may thus not optimally support streaming. In the traditional request/response model, a service provider is essentially constrained to responding to the original service requester, resulting in a lot of roundtrips when multiple service providers are involved. Conventional web services are essentially stateless, because services are constrained from specifying the sequence of messages it expects. Stream processing is a challenge to conventional web services, because a service therein is constrained to getting a message essentially in its entirety before beginning processing related thereto.

BRIEF DESCRIPTION OF THE DRAWINGS

FIG. 2B depicts exemplary data flow associated with an embodiment of the present invention.

FIG. 2C depicts typical data flow associated with a conventional solution.

FIG. 3 depicts an exemplary stream processing unit, according to an embodiment of the present invention.

FIG. 4 depicts an exemplary array of effectively stitched stream processing units, according to an embodiment of the present invention.

DETAILED DESCRIPTION

Figure 1:
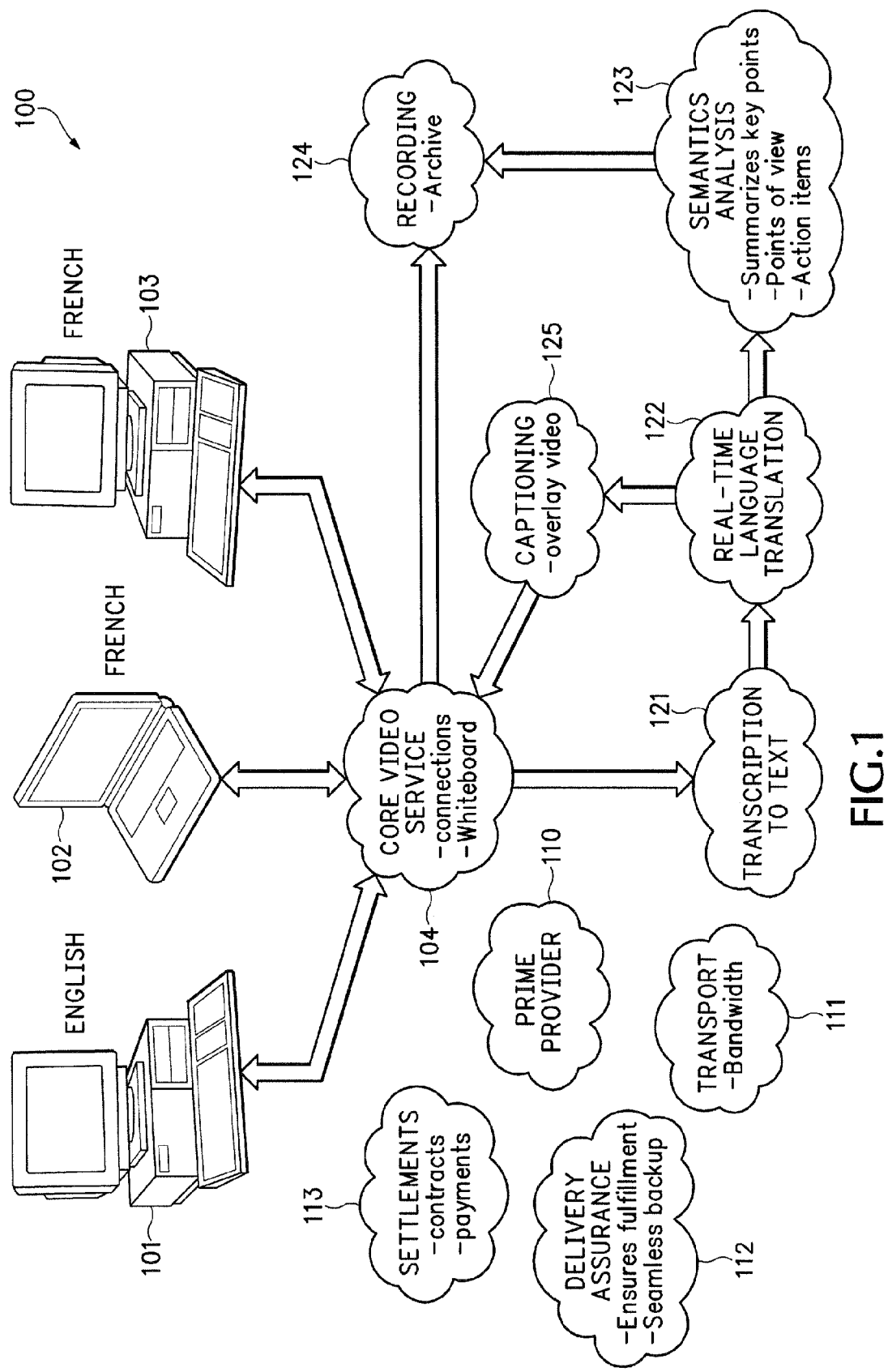
FIG. 1 depicts an exemplary use case supportable with an embodiment of the present invention.

Exemplary embodiments of systems and methods for stream processing web services are described below. Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims.

Furthermore, in the following detailed description of exemplary embodiments of the present invention, numerous specific details are set forth in order to provide a thorough understanding of the present invention. However, one of ordinary skill in the art will realize that embodiments of the present invention may be practiced without these specific details. In other instances, well-known devices, methods, systems, processes, procedures, components, circuits and apparatus, protocols, standards, etc. have not been described in detail so as not to unnecessarily obscure aspects of the present invention.

Portions of the detailed description that follows are presented and discussed in terms of processes. Although blocks and sequencing thereof are disclosed in flowchart figures herein (e.g., FIG. 7) describing the operations of these processes (e.g., process 70), such blocks and sequencing are exemplary. Embodiments of the present invention are well suited to performing various other blocks or variations of the blocks recited in the flowchart of the figure herein, and in a sequence, order, etc. other than that depicted and described herein, except as described herein otherwise.

Embodiments of the present invention relate to methods and systems for stream processing data relating to web services. One system, a stream processing unit, has an input pipe for receiving multiple interrelated session based messages according to an order with which they originate. A processor processes an accumulation of the messages upon reaching a trigger point related to grammar characterizing the messages.

Embodiments of the present invention thus allow efficient handling of a web services related message stream, without the bottlenecking that can occur with a single flow control point while simultaneously enjoying the manageability benefits inherent in such a centralized architecture. In embodiments described herein, efficient streaming web services are achieved without requiring interception and without requiring a central point, through which essentially all streaming web services data must flow. Further, embodiments of the present invention achieve a stateful streaming of data relating to web services to achieve functionality that typically stateless transactional conventional web services may lack or perform with less than optimum efficiency and/or bandwidth consumption.

Exemplary Use Case

FIG. 1 depicts an exemplary use case environment 100 supportable with an embodiment of the present invention. In the environment 100 depicted in FIG. 1, a video conferencing session exemplifies a streaming web services business use case. The video conferencing use case depicted in FIG. 1 includes translation services 122 and other transcoding related services, which effectively add value to the video conferencing itself.

It should be appreciated that video conferencing exemplifies merely a single beneficial application of streaming web services and is in no way meant to suggest that the usefulness of embodiments of the present invention are delimited or constrained thereto. On the contrary, embodiments of the present invention are useful in a number of stream processing contexts, situations, circumstances, applications, etc. that are exemplified herein with the environment 100 depicted in FIG. 1, yet which may differ therefrom in one or more respects. Streaming web services that are effectively performable with embodiments of the present invention can include for example, in addition to the video conferencing depicted, image processing such as colorizing, edge sharpening and the like. Environment 100 is thus supportable with an embodiment of the present invention.

Each of the web services referred to in the present description may relate to a service provider independent of the others. Further, the streaming data flows described herein are selected for the purposes of illustration and not to suggest any particular limitations or constraints on data flow. Other data flow streams may also exist between the various web services providers described herein.

In environment 100, three users are video conferencing, thus generating, exchanging, sending and receiving streams of data. User 101 is an English language based user, while in the present example, users 102 and 103 are French language based. It should be understood however that embodiments of the present invention are not constrained to use with any particular languages but may be used with any languages.

A prime provider 110 acts for all of the users 101, 102 and 103 and selects all of the component services for the video conferencing. A delivery assurance provider 112 interacts with all component web services in environment 100 to promote fulfillment and seamlessly provide backup thereto. A transport provider 111 functions to provide (e.g., assure, allocate, arrange, obtain, etc.) the bandwidth needed for streaming the web services. A settlements provider 113 handles administrative, transactional and related web services such as contracts, payments, tariffs, etc. that may be associated with the video conferencing.

The users 101, 102 and 103 exchange essentially direct videoconferencing data feed via a core video service provider 104, which maintains a connection whiteboard and performs other videoconferencing functionality. Some streaming web services add value to the videoconferencing functionality. For instance, transcription services 121 transcribe the dialog of users 101, 102 and 103 associated with the videoconference between them into a text based format.

The transcription services 121 can be used with real time translation services 122. The real time translation services 122 are streamed to captioning services 125, which stream back to the core video service 104 and are overlaid therewith as captions on the video each of the users 101, 102 and 103 watch. This allows each of the users 101, 102 and 103 to read, in their own localized language, a caption translating what the other users are saying in their own languages.

The real time language translation services 122 provide a streaming data flow as well to a semantic analysis service 123. The semantic analysis service 123 provide semantic analysis with the translation provided with the translation services 122 to allow, for instance summarization of key points, framing of points of view corresponding to each of the users 101, 102 and 103 and generating action items from the videoconference. These semantic analyses are streamed from semantic analysis services 123 to a recording service 124, which also receives an essentially direct video feed from the core video service 104, with overlays. Recording services 124 archive the video feed of the conference as well as the semantic analysis thereof.

It is again emphasized that the exemplary video conferencing use case described above exemplifies merely a single beneficial application of streaming web services and is in no way meant to suggest that the usefulness of embodiments of the present invention are delimited or constrained thereto. Embodiments of the present invention are useful in a number of stream processing contexts, situations, circumstances, applications, etc. that are exemplified herein with the environment 100 depicted in FIG. 1, yet which may differ therefrom in one or more respects. Network providers can use embodiments of the present invention to add value to multimedia and other streams with stream processing.

Users at various localities thus can, through the network, add value to multi-media streams from auxiliary and other information sources, expanded databases and other sources. Personalization can thus be effectuated, for instance based on subscriber needs, location related uniqueness, access, endpoints, subscriptions and other access arrangements and the like. Selectivity is effectuated, such as with time multiplexing for targeted advertisement or other data insertion and/or alternate scenes, which can allow censorship and broader views. Augmentation and/or modification makes additional or modified stream content available, for instance, as additional stream/overlay, modified streams, etc. This feature can allow for integrated targeted advertisements, hyperlinks, pop-ups, generated language streams, censorship and/or spatial addition. Adaptation is achievable in one embodiment to a variety of protocols, to bandwidth availability and grooming.

In one embodiment, integrated targeted advertisements can be effectuated with tagged areas, such as a billboard, sign or label in a stream. Tagged, visual, audio and/or text recognition and/or other stream trigger action/conditional user (e.g., subscriber) actions can allow credit-listed bios, dictionary service, document retrieval and display and "fact" checking. Censorship can be effectuated with tagged, visual, audio and/or text recognition and/or other stream triggering appropriate video, audio, graphical and/or text censorship, such as with pixelizing, frame substitution, word/phrase substitution, etc.

Figure 2A:
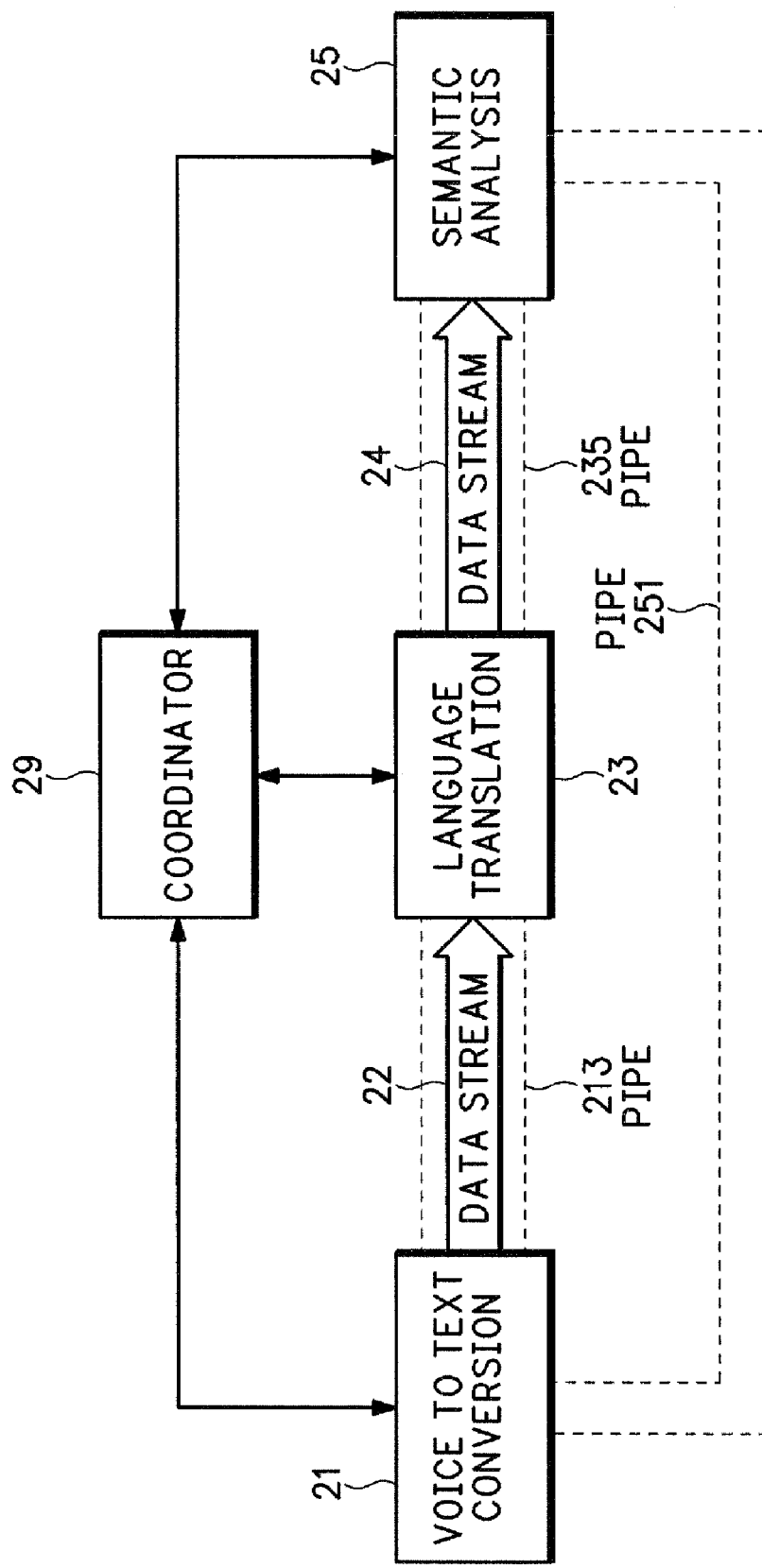
FIG. 2A depicts an exemplary data flow associated with a use case supportable with an embodiment of the present invention, e.g., such as that depicted in FIG. 1.

In one embodiment, language streams can be generated. For instance, audio and/or text inputs can generate text or audio for un-supported spoken and sign languages. Streams can be merged, such as with mixing in external audio/text or other content and/or using external content for control, e.g., a mask stream, which can function as a trigger stream for censorship. Alarm streams can be generated with the aggregation, analyzing, filtering and forwarding of streams from traffic, security, wellness and other cameras and other information sources. Spatial components can be added to audio streams, such as for conferencing, gaming, or to push a picture for an active speaker Exemplary Data Flow FIG. 2A depicts an exemplary data flow 20 associated with a use case supportable with an embodiment of the present invention (e.g., such as that depicted in FIG. 1). Embodiments of the present invention are useful in a number of stream processing contexts, situations, circumstances, applications, etc. that are exemplified herein with the data flow 20 depicted in FIG. 2A, yet which may differ therefrom in one or more respects.

In one embodiment, data flow 20 supports the translation of an audio stream 22 in one language, such as English, translation thereof into a second language, such as Japanese (or the French of FIG. 1), etc. and the indexing of the translated audio clip stream 24, such as for subsequent search services. A voice to text conversion service 21 streams an effectively textualized audio stream 22 to a language translation service 23. The language translation service 23 streams the translated textualized audio clip 24 to a semantic analysis service 25 to be indexed. The semantic analyzer 25 can add indexing information to the stream in one (or more) of several ways. For instance, semantic analyzer 25 may add indexing information to the stream at a point wherein the topic shifts or the agenda changes, when the speaker changes, and/or just preceding the making of a key point, among others.

Exemplary Bifurcated Control and Processing Functionalities

In one embodiment, the effective bifurcation of control and processing functions related to streaming web services data flow 20 achieves both manageability and efficiency. Voice to text conversion service 21 sends a request for the translation and indexing to a coordinator 29, which establishes a session to fulfill that request. With reference again to FIG. 1 as well, in one embodiment, prime provider 110 has functionality in environment 100 that may relate to that associated with coordinator 29.

The coordinator 29 selects the appropriate service providers 21, 23 and 25, e.g., from among one or more others such as depicted in FIG. 1. The coordinator 29 handshakes with service providers 21, 23 and 25 to establish a pipe 213 from voice to text conversion service 21 to translation service 23, a pipe 235 from translation service 23 to semantic analysis service 25 and a pipe 251 from semantic analysis service 25 to voice to text conversion service 21. The coordinator 29 sends a response to voice to text conversion service 21 that a session, e.g., a web services streaming session, has been established.

It can be expected that, in practice, there may be multiple services, which could be selected from to perform the services described herein with reference to exemplary service providers 21, 23 and/or 25. Thus, the coordinator 29 effectively functions as a prime provider and can select from among multiple providers to perform the exemplary functions described above with reference to providers 21, 23 and 25. The selection of providers made by coordinator 29 can be based on multiple factors, an example of which includes latency between subsequent processing nodes. Exemplary providers 21, 23 and 25 herein thus may represent three of multiple other candidate service providers.

In other embodiments, other methods connect sequences of stream processing units. In one embodiment, a service builder such as coordinator 29 has knowledge beforehand all that must be done to connect the proper sequence and makes arrangements accordingly to effectively assemble and connect the stream processing units needed to accomplish this. In another embodiment, individual stream processing units communicate specifics relating to subsequent (e.g., the next) process to occur on their output stream to the coordinator. The coordinator then finds and makes a connection to the subsequent stream processing unit. In yet another embodiment, a hybrid of these techniques is used. It should be appreciated that embodiments of the present invention are well suited to use other techniques as well for connecting appropriate sequences of stream processing units.

Voice to text conversion service 21 digitizes the voice data into an English text message, which it sends to translation service 23. Translation service 23 waits for the voice text stream 22 to accumulate as determined by the grammar, e.g., to a certain preset size or a specific semantically significant structure, such as a paragraph, sentence or phrase, etc., wherein it performs processing thereon relating to English to Japanese translation. The translation is sent as translated message clip 24 to semantic analysis service 25. An acknowledgement can be sent to the coordinator 29 in confirmation of completing the translation related processing or indicating the progress thereof.

Semantic analysis service 25 may be driven to trigger based on one or more factors. For instance, semantic analyzer 25 can wait for the voice text stream 22 to accumulate to a certain preset size, wherein it performs processing thereon relating to indexing, or it may trigger on a word, a phrase, a sentence, a paragraph and/or another semantically convenient unit. The indexed stream can be stored for later use. It can also be sent back to client 21 if desired, as is an acknowledgement to the coordinator 29 in confirmation of completing the indexing related and e.g., other session based processing is complete.

FIG. 2B depicts exemplary data flow 200 associated with an embodiment of the present invention. Once service builder (e.g., coordinator) 290 sets a session for streaming Web processing, the data flows from the client 210 to stream processor 'A' 201. Upon processing, data flows from stream processor 'A' 201 to stream processor 'B' 202. Upon processing, data flows from stream processor 'B' 202 to stream processor 'C' 203. And upon processing, data flows from stream processor stream processor 'C' 203 back to client 210.

In one embodiment, the network bandwidth consumed to effectuate the session depicted with data flow 20 is given by $$BW=(N+1)M \quad \text{(Equation 1)}$$

wherein N represents the number of networked service providers and M represents message size. The present embodiment represents an economizing of bandwidth over conventional solutions, which can be beneficial where the number of service providers is large. Moreover, the present embodiment can enjoy reduced latency with respect to the latency typically associated with conventional approaches, because data transfers with coordinator 29 are not required. The flow economy and latency reduction can be depicted as shown below.

The flow economy, bandwidth and latency benefits allowed with embodiments of the present invention as shown in FIGS. 2A and 2B contrasts with the conventional data flow required for such stream processing. FIG. 2C depicts typical data flow associated with a conventional solution. Data flows between the client 2100 and conventional service builder 2900 as the client 2900 requests the services. Data then flows between conventional service builder 2900 and stream processor A' 2011 to request its service. Upon stream processor 2100 processing the service request, it returns corresponding data to service builder 2900, which must then send data to stream processor B' 2012. Upon stream processor 2012 processing the service request, it returns corresponding data to service builder 2900, which must then send data to stream processor C' 2013. Upon stream processor 2013 processing the service request, it returns corresponding data to service builder 2900, which must then return the stream processed data to client 2100.

Conventionally, streaming functionality to perform what is depicted in FIGS. 2A and 2B (and e.g., FIG. 1) can consume significantly more network bandwidth and have significantly greater latency than achievable with embodiments of the present invention. For example, consider a conventional solution to the function depicted in FIG. 2A, e.g., translating an English audio stream into Japanese and indexing it for subsequent search.

In this example, a voice to text conversion service digitizes voice data into an English text message corresponding thereto and sends the English text message to a central coordinator, which also functions as the central coordinator in subsequent value added processing services of the voice data. The central coordinator waits for the voice text stream to accumulate to a certain size, and then sends it to a translation service for translation related processing.

The translation service decodes XML code associated with the voice text stream and gets back the voice data. However, it must wait (e.g., statelessly) for subsequent messages until a whole sentence (e.g., or paragraph or other convenient semantically processable structure, unit, etc.) is obtained. Upon obtaining the whole sentence (and e.g., only then), the translation service performs its translation related processing thereon. Upon completion of its translation, the translation service sends the translated Japanese text to the central coordinator.

Upon collecting the Japanese text, the central coordinator sends it to a semantic analysis service. The semantic analysis service unpacks the XML code therein and thus obtains the Japanese text therein, with which it performs processing related to indexing. Upon completing the indexing, the semantic analysis service sends the indexed text to the central coordinator. At that point, the central coordinator then finally sends a completion message to the client.

Bearing in mind the amount of data contained in the voice traffic, this conventional example demands six network trips thereof:

A. client to central coordinator;
B. central coordinator to translation service;
C. translation service to central coordinator;
D. central coordinator to indexing service;
E. indexing service to central coordinator; and
F. central coordinator to client.

There are two value added service providers, one for the translation and the other for the indexing, in the current example. Thus in the general case where the message size is M and N is the number of service providers, the bandwidth consumed by this conventional example is given by $$BW_{conventional}=2M(N+1) \quad \text{(Equation 2)}.$$

Further, the mean latency associated with such a conventional model is the sum of the mean latencies of the 2(N+1) transfers. Embodiments of the present invention may thus enjoy significant bandwidth and latency benefits when contrasted with conventional models.

Exemplary Stream Processing Unit

FIG. 3 depicts an exemplary stream processing unit 300, according to an embodiment of the present invention. Stream processing unit (SPU) 300 represents an abstract data flow processing model based on a data flow concept. SPU 300 has at least one input pipe 301 and can have multiple input pipes, such as input pipe 302. Data ingressing multiple input pipes 301 and 302 can be rendezvoused and/or conditionally prioritized. Data is placed in a particular input pipe 301 or 302, etc. on the basis of an input pipe address such as a universal resource locator (URL) corresponding thereto. These data comprise a XML scheme documentation (XSD) schema and grammar characterizing the message. In one embodiment, the XSD schema and/or the grammar are encoded in SOAP Service Description Language (SSDL).

SPU 300 further exemplifies a mechanism for inserting application specific processing logic for functionality associated with processor 310. SPU 300 effectively defines a unit of processing associated with a batch of messages. SPU 300 accumulates messages from input pipes 301 and 302 until a specific pattern is matched. The pattern is defined in one embodiment with grammar, e.g., one or more underlying grammars with which the input streams of SPU 300 are programmed.

Upon matching the grammatical pattern, processor 310 begins to process the entire batch of messages that were received prior to matching the grammar. Grammar functions for processing multiple messages, e.g., for accumulating multiple messages into a state ready for processing. For example, where each word in a voice stream comprises a message, a language translation service typically accumulates a whole phrase, sentence, or other significant semantically and/or syntactically convenient unit before beginning the processing tasks relating to its translation services.

SPU 300 has zero, one or multiple output pipes such as output pipes 320 such as output pipes 321, 322 and 323. Output pipes 320 may be conditionally used, used for unicast and/or used for multicast, wherein data is sent therefrom to specifiable locations, such as another SPU stitched to SPU 300. Where SPU 300 has zero output pipes 320, it effectively acts as a sink for data received via input pipes 301 and 302. SPU 300 thus exemplifies a mechanism for splitting and joining data flow.

Upon completion of the processing functions of processor 310, another sequence of messages, resulting e.g. from the processing of the original messages, which may differ from the original messages, are placed into the output pipes 320 (unless e.g., the processed data is to be sunk in SPU 300). In one embodiment, the new sequence of messages also comprises a XSD schema and grammar that are encoded in SSDL. The output pipes 320 allow egress of the new sequence of messages to the specified locations. The present embodiment thus stands in contrast to the conventional model, wherein the processing result is sent back to the requester such as a central coordinator.

FIG. 4 depicts an exemplary array 40 of effectively stitched stream processing units, according to an embodiment of the present invention. A streaming web service application is effectively created by stitching the multiple SPUs together. Messages placed in the output pipes of the various SPUs of array 40 specify an input pipe and an endpoint address corresponding to another, e.g., subsequent SPU.

A producer application 49 feeds messages into the input pipe 411 of an SPU 41. Upon accumulating messages from input pipe 411 until a specific pattern is matched, SPU 41 processes the batch and places new message sequences in output pipes 412 and 413.

The messages in output pipe 412 are sent to the input pipe 421 of SPU 42. The messages in output pipe 413 are sent to the input pipe 422 of SPU 42 and the input pipe 431 of SPU 43. Upon accumulating messages from input pipes 411 and 412 until a specific pattern is matched, SPU 42 processes the batch and places a new message sequence in output pipe 423. The messages egressing SPU 42 from output pipe 423 are sent to the input pipe 441 of SPU 44. Upon accumulating messages from input pipe 431 until a specific pattern is matched, SPU 43 processes the batch and places new message sequences in output pipes 432 and 433.

The messages in output pipe 432 are sent to the input pipe 442 of SPU 44.

Upon accumulating messages from input pipes 441 and 442 until a specific pattern is matched, SPU 44 processes the batch and effectively functions as a sink for the processed information. The messages in output pipe 432 are also sent, along with the messages in output pipe 433, to the input pipe 451 of SPU 45. Upon accumulating messages from input pipe 451 until a specific pattern is matched, SPU 45 processes the batch and places new message sequences in output pipes 452 and 453, which can be sent elsewhere or function as an application output of web services SPU array 40.

Array 40 thus comprises an effectively data driven web services network. Metadata attached to the messages transferred with array 40 is defined and processing is performed when the data is ready to be processed. An embodiment of the present invention thus achieves a statefulness that can be lacking in typically stateless conventional web services technology models. Further, in creating a web services application in array 40, one embodiment functions to establish a session without reliance on an underlying transport characteristic such as Transport Control Protocol (TCP), Hypertext Transfer Protocol (HTTP), cookies or related mechanisms, such as are used in conventional approaches. In one embodiment of the present invention, a service provider and routing topology is constructed at session establishment time.

A session, in the context of the present embodiment, allows interrelated messages to flow from an origination such as producer application 49 to a destination such as any of SPUs 41-45 according to the order with which the interrelated messages are originated. Further, metadata associated therewith is defined. Array 40 functions to define a route at runtime and attach it to a session. Array 40 also route the message and validate its arrival sequence at data transfer time. Upon establishing a session, a session identifier associated therewith is shared among all involved component parties. Thus, the parties route the messages according to the defined route.

A grammar associated with the session defines legitimate sequences of message arrival. The grammar also defines the boundary of a group of messages, which are to be accumulated before meaningful processing activities can begin therewith. The grammar associated with the session is based on concepts familiar from the grammar relating to regular expression. However, the grammar associated with a session is applied on the basis of the messages, in contrast to characters, phonemic components or the like as is typical in the grammar of regular expression. In one embodiment, grammar comprises metadata that is sent on a session basis.

Data flow that streams according to embodiments of the present invention can comprise a wide variety of information. In contrast to stateless transactional conventional models, data streams in one embodiment can be subject to varying levels and kinds of processing as they flow. That which comprises data in a session, that which triggers processing thereof, what functions that processing comprises, which new streams they produce and where the new streams are sent is defined by the grammar. Grammar also checks for the correctness of data flow.

In contrast with conventional approaches, which typically process session initiation protocol (SIP) packets, an embodiment of the present invention functions with the messages themselves The messages can have multiple trigger points in a stream to initiate various kinds of processing. For example, in processing streaming speech or text, a 'phrase complete' trigger can trigger different actions than a 'sentence complete' trigger and triggers may be conjoined and/or separated.

In one embodiment, array 40 comprises a system for processing a stream of data relating to a web service application. The system thus has a first SPU that has at least one input pipe that functions to receive multiple interrelated messages according to an order with which they originate in a given session. The first SPU also has a processor for performing its own (e.g., unique, specialized, etc. associated with that SPU) processing function on the accumulated messages upon reaching a trigger point. The trigger point relates to grammar that characterizes the session's messages. The processing function includes generating a second message based thereon. The first SPU further has at least one output pipe for allowing egress of the second message from the first SPU according to a destination associated with another SPU.

The system also has at least the destination SPU, networked with (e.g., communicatively coupled for data exchange) to the first SPU. The destination SPU has at least one of the input pipes for receiving the second message from the output pipe of the first SPU. The destination SPU has its own processor for performing its own processing function on the accumulated second messages upon reaching a second trigger point, which also relates to the grammar. The destination SPU can comprise an intermediary destination SPU, in which case it further has at least one output pipe and its own processing function comprises an intermediary processing function that includes the generation of a third message. The third message egresses from the intermediary destination stream processing unit from the output pipe thereof to a subsequent destination, such as yet another SPU, stitched within array 40.

Figure 5:
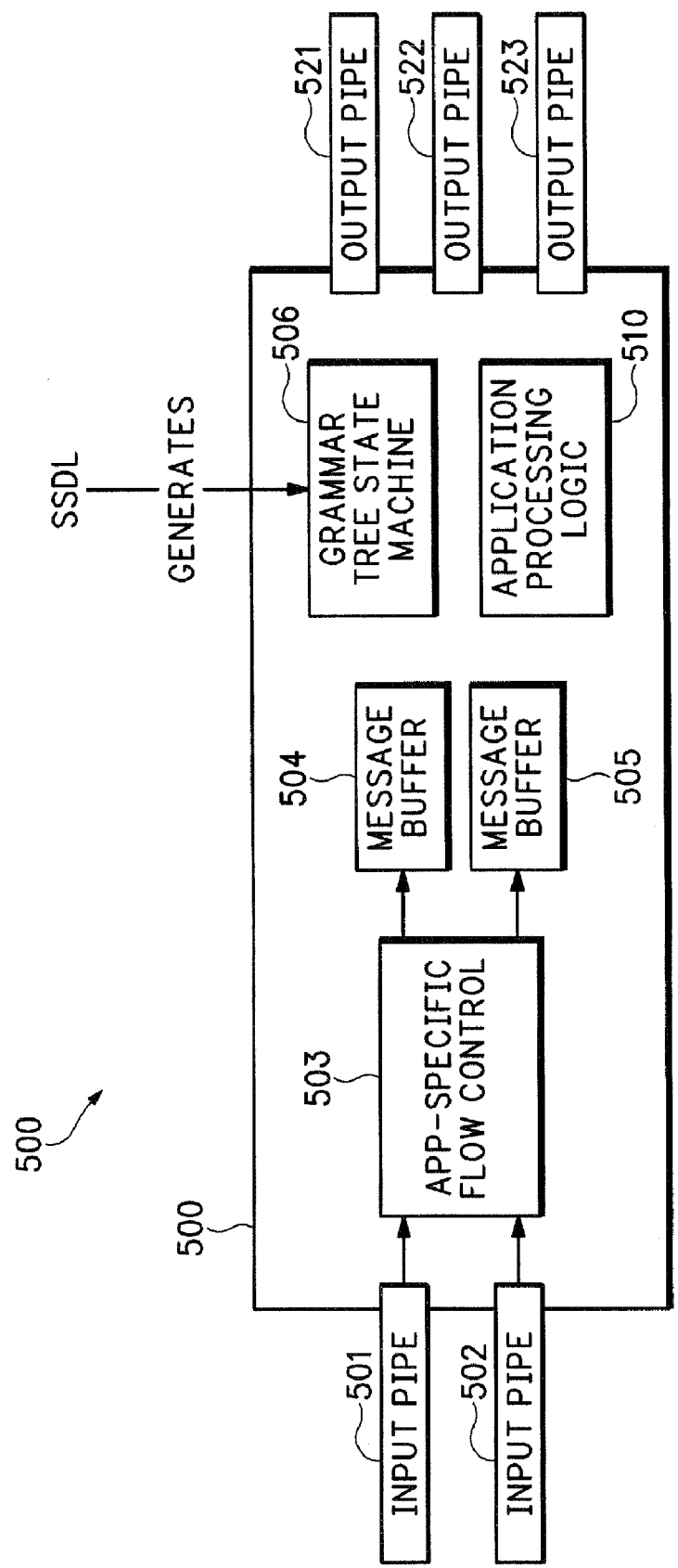
FIG. 5 depicts an exemplary functional stream processing unit, according to an embodiment of the present invention.

FIG. 5 depicts an exemplary functional stream processing unit 500, according to an embodiment of the present invention. Messages arriving at the input pipes 501 and 502 of SPU 500 are buffered by message buffers 504 and 505, which are respectively associated therewith. Application specific flow control logic 503 controls the message flow appropriately for a given programmed application and handles protocol related handshaking associated therewith.

A grammar tree state machine 506 generates a grammar tree from the SSDL components of each input pipe 501 and 502. Grammar tree state machine 506 checks the grammar tree and determines whether a trigger point is reached. Upon reaching an appropriate trigger point, grammar tree state machine 506 allows SPU 500 to enter a state wherein processing is enabled and application processing logic 510 is invoked. For instance, where SPU 500 performs a function related to human language translation such as running an English to Japanese translation service, accumulating a grammatically significant chunk of voice stream data for translation may comprise a trigger point.

Grammatical significance can attach to groupings (e.g., chunks) of data that correlate to one or more qualitative and/or quantitative characteristics. In one embodiment, grammatically significant groupings comprise data chunks such as sentences, phrases, expressions and the like (e.g., sentence based chunks). For instance, such sentence based chunks comprise an efficient grouping in the translation related examples discussed above. However, in another service application, words, phonemes and the like can also have grammatical significance, though in a translation service, such chunks may be somewhat small for efficiency. In the translation related examples, sentences comprise enough of a voice stream to make translation thereof efficient, from the perspective of the translation service. In grammar more associated with video services and the like, a trigger point may relate to accumulating a more graphically significant chunk such as a frame (in contrast to, e.g., a pixel, which may be somewhat small for efficient streaming video processing but may be graphically significant in another web service application). In this example, video processing commences upon accumulating a sequence of frames.

Upon invoking application processing logic 510, processing related to the application is performed on the accumulated messages. SPU 500 can comprise an effective processing sink for the messages accumulated in its input pipes 501 and 502. However, SPU 500 can also perform processing relating to the creation of new messages, upon processing of the messages accumulated in its input pipes 501 and 502. New messages resulting from such processing are created into one or more of output pipes 521, 522 and 523. The new messages can egress therefrom to a new destination.

Grammar tree state machine 506 generates a grammar tree from the SSDL components of the input pipes 501 and 502. The SSDL effectively uses a style related to WSDL to define schema type and related information and for the message format. The SSDL effectively uses a style related to a regular expression (RegEx) to define the grammar of messages that are expected to be received at the input pipes 501 and 502 and for messages expected to be created into the output pipes 521-523.

The SSDL defines the triggering conditions for processing to be performed with application processing logic 510 in terms of joining pipes, e.g., joining input pipes 501 and/or 502 to output pipes 521, 522 and/or 523. Table 1 below includes an exemplary sample of SSDL, as used with an embodiment of the present invention.

TABLE 1

Exemplary SSDL

```
<ssdl>
    <type>*
        <element name="T1"> ... </element>*
    </type>
    <message name="p1">*
        <part ... element+"T1"/>*
    </message>
    <input>
        <pipe name="in1">*
            <pattern name="p1">m1.m2?.[m5, m6]+</pattern>*
        </pipe>
    </input>
    <output>?
        <pipe name="out1">*
            <pattern name="pp1">m3.m5+</pattern>*
        </pipe>
    </output>
    <processing>+
        <trigger>
            <input>in1, in2</input>
            <joinPattern>in1:p1, (in2:p2)3</joinPattern>
            <produce>out1:pp1, out2:pp2, out2:pp3</produce>
        </trigger>
    </processing>
</ssdl>
```

In the exemplary SSDL code shown in Table 1, an element type is defined, which essentially defines a schema for the session. A pattern is named and grammar corresponding to the pattern is defined. The pattern can have zero, one or multiple components. In the exemplary pattern shown above, a message 1 and a message 2 are expected, followed by any message, then message 5 and message 6, multiple times. Next, the SSDL code sets a trigger point, wherein conditions are defined for the implementation of a processing operation. In the exemplary SSDL shown above, the trigger is defined as two inputs, followed by a joinder pattern, which is repeated three times. The output destination for the message product corresponding to the triggered processing result is then set.

Thus, an embodiment of the present invention establishes a session prior to sending out any data associated therewith and verifies the presence of preset grammar conditions before invoking processing therewith.

Exemplary Run Time Flow

Figure 6:
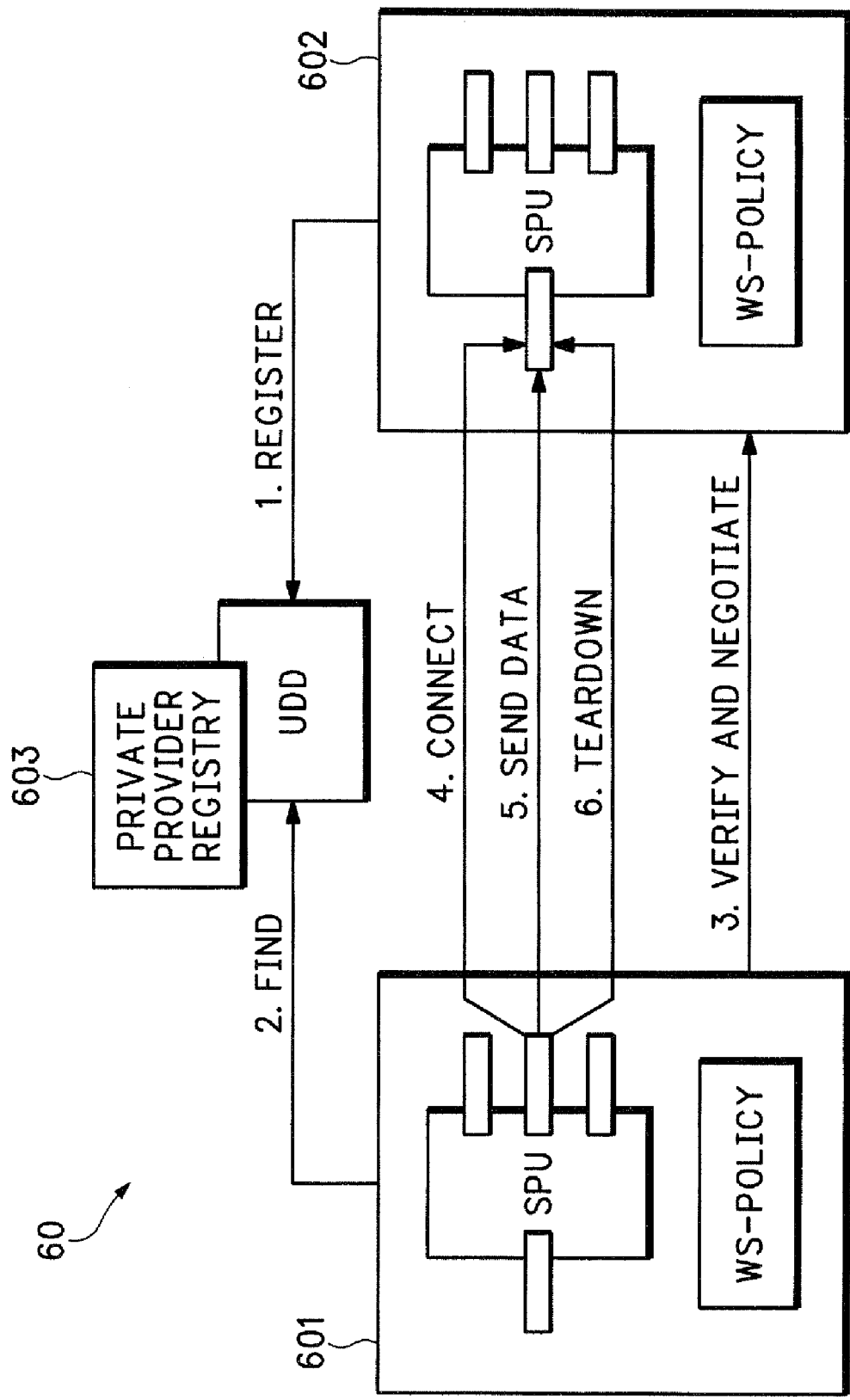
FIG. 6 depicts an exemplary run time stream flow associated with streaming between multiple stream processing units, according to an embodiment of the present invention.

FIG. 6 depicts an exemplary run time flow 60 associated with streaming between multiple stream processing units, according to an embodiment of the present invention. In one embodiment, an SPU 601 that operates according to a programmed web services policy 610 registers with a provider registry 603, which can be a private registry. An SPU 602 finds SPU 601 using the provider registry 603. In one embodiment, registration and finding a registered SPU comprise UDDI related functions.

Decisions relating to stitching SPUs can thus be made at design time or at run time. Contracts, e.g., relating to stitching, web services, protocols, handshaking, grammar, etc., are generated and distributed to all participating SPUs when the stitching decisions are made at design time. At run time, SPU 602 calls SPU 601 and verifies the existence of a contract therewith, which implies pre-existing stitching arrangements, effectively skips the registration and finding and negotiates with SPU 601 to compare web services policies 610 and 620. In this case, SPU 601 and SPU 602 commence their session according to the contract.

The session proceeds with SPU 602 connecting, e.g., with one of its output pipes, to an input pipe of SPU 601 according to the contractual or other stitching decisions. SPU 602 then sends data to SPU 601. Upon reaching a grammar related trigger point, SPU 601 processes the data. Upon passing the available run time data to SPU 601, notification from SPU 601 that processing thereof has commenced, or an agreed upon session termination point, SPU 601 tears down its connection with SPU 601. An embodiment of the present invention thus establishes a session prior to sending out any data associated therewith and verifies the presence of preset grammar conditions before processing is performed therewith.

In one embodiment, the grammar, e.g., as an external contract, is defined within the SSDL code. In one embodiment, grammar is exchanged in a manner similar to the exchange of WSDL. In one embodiment, SSDL is associated with a URL, and is thus accessible with HTTP. Hosting related to the URL is not particularly germane to the operation of this embodiment. In one embodiment, the service provider implements its functionality according to what is defined in the SSDL, e.g., including the specified grammar therein. However, the service provider can also feed messages to service consumers according to the SSDL, as well.

In binding service providers and consumers, one embodiment implements a service coordinator (e.g., coordinator 29; FIG. 2), which establishes a path prior to commencement of data traffic. The service coordinator thus determines what providers are available. The service consumers specify their needs to the coordinator (e.g., in terms of a chain of required service providers, selection criteria, etc. These functions can be performed with a variety of known techniques.

Grammar for each stream can be sent to the SPUs in one or more of several ways. In one embodiment, a coordinator/service builder loads each SPU with the grammar for its input flows, which are processed with a downloaded program. In another embodiment, a coordinator/service builder loads a previous SPU with grammar for its output streams, which are then transmitted to a subsequent SPU at which it functions as an input stream.

Figure 7:
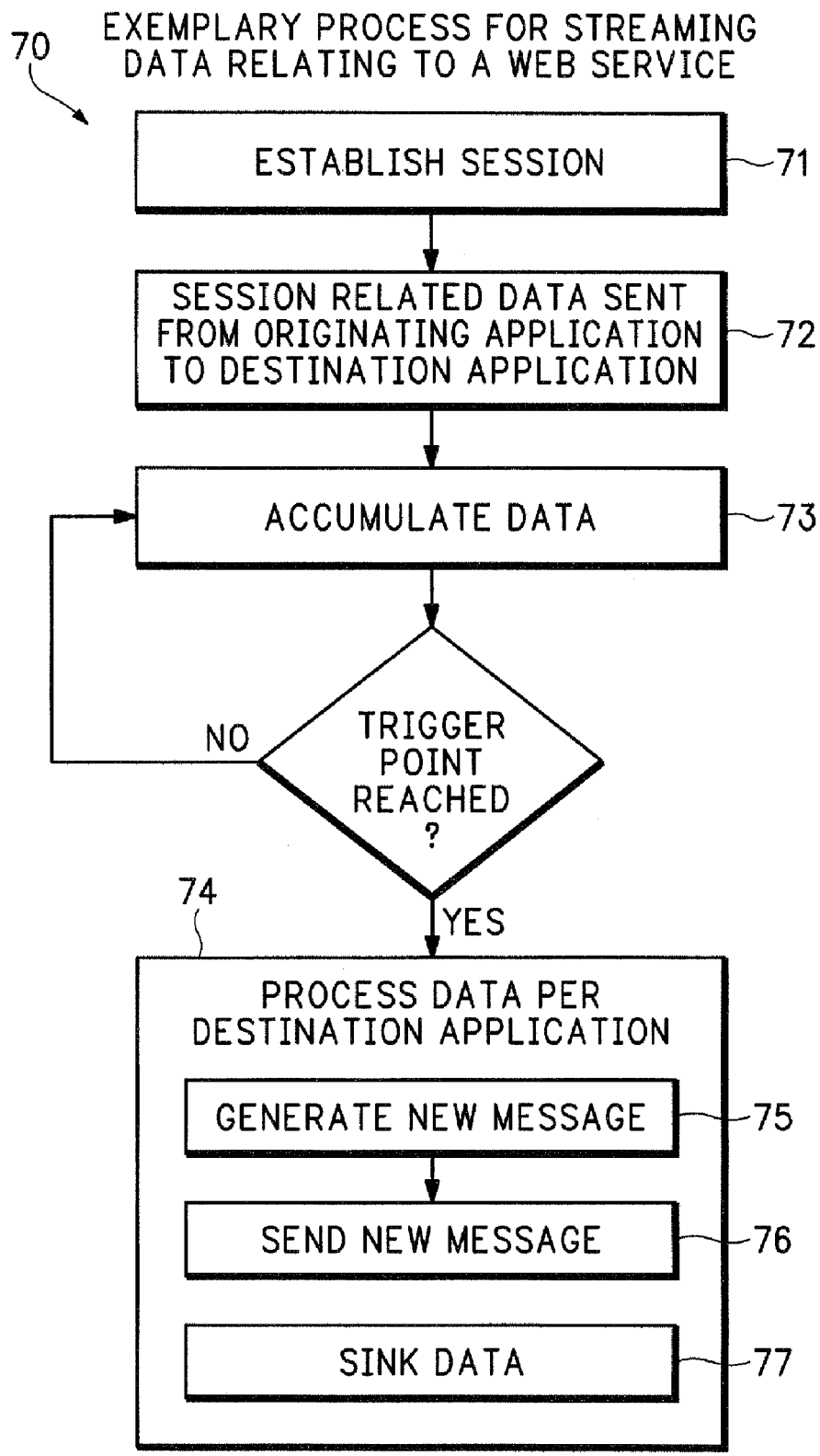
FIG. 7 depicts a flowchart of an exemplary computer implemented stream processing method, according to an embodiment of the present invention.

FIG. 7 depicts a flowchart of an exemplary computer based method 70 for streaming data relating to a web service, according to an embodiment of the present invention. In block 71, a session is established, which allows multiple interrelated messages to flow from an originating application to a destination application according to the order with which they are originated.

Upon establishing the session, in block 72 session related data are sent with the messages from the originating application to the destination application. In one embodiment, the applications comprise application processing logic, a processor, etc, associated with an SPU.

In block 73, the data is accumulated until a trigger point related to a grammar characterizing the session messages is reached. Upon reaching the trigger point, in block 74 the data is processed according to a function related to the destination application.

In one embodiment, the processing includes generating a new message based thereon in block 75 and sending the new message to a subsequent destination, in block 76. In one embodiment, the processing includes sinking the data, in block 77.

In one embodiment, process 70 is performed with a computer system that functions according to code readable therewith and, e.g., encoded in a computer usable medium. Process 70 can be performed with a variety of means. In one embodiment, process 70 is performed with an SPU. In one embodiment, process 70 is performed with a system that comprises one or more SPUs, which can be stitched together. In one embodiment, process 70 relates to management of a network for allowing streaming web services to function effectively therewith. With the collection of a fee or other consideration for such network management, in one embodiment, process 70 is used with a business or other network management entity for generation of revenue, covering costs and providing networking services to customers, etc.

Embodiments of the present invention, systems and methods for stream processing data relating to a web service application are thus described. While the present invention has been described in particular embodiments, it should be appreciated that the present invention should not be construed as limited by such embodiments, but rather construed according to the following claims.

What is claimed is:

1. A unit for processing a stream of message data relating to a web service application, comprising:
   at least one input pipe for receiving a plurality of interrelated messages according to an order with which said messages are originated;
   a processor for processing an accumulation of said messages upon reaching a trigger point related to a grammar characterizing said messages, wherein the trigger point is a particular pattern of data included in the plurality of interrelated messages;
   the processor configured to analyze information included in the plurality of interrelated messages for the particular pattern as the plurality of interrelated messages are streamed to the processor, and upon detecting the particular pattern in a currently received one of the interrelated messages, initiate processing of those previously received messages that did not include the particular pattern of data according to said analysis;
   at least one output pipe, wherein the at least one output pipe connects the stream processing unit to at least one remote stream processing unit over a packet switched network; and
   the processor configured to: generate a new message during the processing of the accumulation of messages; and place said new message in a particular output pipe for transmission over the packet switched network to a subsequent remote stream processing unit having a different network address than the stream processing unit, wherein said new message is sent thereto using the particular output pipe.

2. The stream processing unit as recited in claim 1 wherein said stream of message data is handled therewith according to a session wherein said messages are originated with a service provider, wherein a data flow relating to said session is routed according to a topology created for said session and wherein said service provider and said topology are selected at an establishment time corresponding to said session.

3. The stream processing unit as recited in claim 1 wherein said processing comprises sinking said message data.

4. The stream processing unit as recited in claim 1 further comprising a grammar tree state machine that controls said processor according to said trigger point.

5. The stream processing unit as recited in claim 1 further comprising a message buffer associated with each said input pipe configured to store said accumulation.

6. The stream processing unit as recited in claim 5 wherein said grammar comprises:
   a definition of a grouping of data corresponding to said accumulation; and
   data flow associated with said stream of data.

7. The stream processing unit as recited in claim 6 wherein said data flow comprises one or more of a split and a join operation.

8. The stream processing unit as recited in claim 1 wherein said grammar comprises metadata associated with code comprising said messages.

9. A method for streaming data relating to a web service, comprising:
   establishing a session, wherein said session allows a plurality of interrelated messages to flow from an originating application to a destination application according to the order with which said messages are originated;
   upon said establishing, sending data related to said session from said originating application to said destination application with said messages;
   accumulating said data until a trigger point related to a grammar characterizing said messages is reached, wherein the trigger point is a particular pattern of data included in the plurality of interrelated messages;
   analyzing information included in the plurality of interrelated messages for the particular pattern as the plurality of interrelated messages are streamed to a stream processing unit, and upon detecting the particular pattern in a currently received one of the interrelated messages, initiate processing of those previously received messages that did not include the particular pattern of data according to said analysis;
   generating a new message during the processing of the accumulation of messages; and
   placing said new message in a particular output pipe for transmission over a packet switched network to a subsequent remote stream processing unit having a different network address than the stream processing unit, wherein the particular output pipe connects the stream processing unit to the subsequent remote stream processing unit over the packet switched network.

10. The method as recited in claim 9 wherein said processing comprises sinking said data, wherein a functionality performing said processing comprises said destination application.

11. A computer usable medium having encoded thereon computer readable code for controlling a computer system to perform a process for streaming data relating to a web service, said process comprising:
   establishing a session, wherein said session allows a plurality of interrelated messages to flow from an originating application to a destination application according to the order with which said messages are originated;
   upon said establishing, sending data related to said session from said originating application to said destination application with said messages;
   accumulating said data until a trigger point related to a grammar characterizing said message is reached, wherein the trigger point is a particular pattern of data included in the plurality of interrelated messages;
   analyzing information included in the plurality of interrelated messages for the particular pattern as the plurality of interrelated messages are streamed to a stream processing unit, and upon detecting the particular pattern in a currently received one of the interrelated messages, initiate processing of those previously received messages that did not include the particular pattern of data according to said analysis;
   generating a new message during the processing of the accumulation of messages; and
   placing said new message in a particular output pipe for transmission over a packet switched network to a subsequent remote stream processing unit having a different network address than the stream processing unit, wherein the particular output pipe connects the stream processing unit to the subsequent remote stream processing unit over the packet switched network.

12. A system for streaming data relating to a web service, comprising:
   means for establishing a session, wherein said session allows a plurality of interrelated messages to flow from an originating application to a destination application according to the order with which said messages are originated;
   means for, upon said establishing, sending data related to said session from said originating application to said destination application with said messages;
   means for accumulating said data until a trigger point related to a grammar characterizing said messages is reached, wherein the trigger point is a particular pattern of data included in the plurality of interrelated messages;
   means for analyzing information included in the plurality of interrelated messages for the particular pattern as the plurality of interrelated messages are streamed to a stream processing unit, and upon detecting the particular pattern in a currently received one of the interrelated messages, initiate processing of those previously received messages that did not include the particular pattern of data according to said analysis;
   means for generating a new message during processing of the accumulation of messages; and
   means for placing said new message in a particular output pipe for transmission over a packet switched network to a subsequent remote stream processing unit having a different network address than the stream processing unit, wherein the particular output pipe connects the stream processing unit to the subsequent remote stream processing unit over the packet switched network.

13. The stream processing unit as recited in claim 1 wherein the trigger point is included in the plurality of interrelated messages.

* * * * *